June 17, 1958 R. M. WOLFE 2,839,738

ELECTRICAL CIRCUITS EMPLOYING FERROELECTRIC CAPACITORS

Filed Dec. 10, 1956

NORMAL FERROELECTRIC

INTERNALLY BIASED FERROELECTRIC

INVENTOR
R. M. WOLFE

ATTORNEY

United States Patent Office 2,839,738

Patented June 17, 1958

2,839,738

ELECTRICAL CIRCUITS EMPLOYING FERRO-ELECTRIC CAPACITORS

Robert M. Wolfe, Colonia, N. J., assignor to Bell Telephone Laboratories, Incorporated, New York, N. Y., a corporation of New York Application December 10, 1956, Serial No. 627,380

8 Claims. (Cl. 340—173)

This invention relates to shift register circuits and more particularly to those of the type utilizing ferroelectric capacitors as the storage elements.

Ferroelectric shift registers of the type in which stored information signals are shifted progressively from stage to stage, and in which capacitors including a dielectric material having the characteristic of remanent polarization of electrostatic dipoles are used as the storage elements, may have wide application in systems dealing with binary information or the binary treatment of information, among which systems are computers, telephone systems, logic circuitry and the like.

The remanent polarization existing in ferroelectric capacitors constitutes the means whereby the storage of binary information is rendered possible. This characteristic is found in certain crystalline structures, such as barium titanate or guanidinium aluminum sulphate hexahydrate, which exhibit a substantially rectangular hysteresis loop curve as the plot of charge corresponding to applied voltage, or charge displacement vs. electric field. Normal ferroelectric crystals, initially uniformly polarized by the appilcation of an external voltage of a given polarity to the terminals of the capacitor of which the crystal is the dielectric, store an equivalent charge in the alignment of the electric dipoles within the dielectric. This dipole alignment remains when the applied voltage is removed, providing the remanent polarization and accounting for the hysteresis loop plot. If a voltage of opposite polarity is applied and then removed, the dipole alignment is established in the opposite direction and a value of charge remains which is negative to the previous value of charge. During the reversal of polarization a comparatively large change of charge in the capacitor occurs, thus producing a large value of effective capacitance. If, however, a voltage is applied which is opposite in polarity to that which would switch the electric dipoles, very little charge is stored and the effective capacitance of the unit is comparatively small. A normal ferroelectric capacitor can be an effective storage element for binary information since it possesses two stable states of remanent dielectric polarization and the existing state can be determined by applying a read-out pulse, among other methods, to test the impedance and thereby the effective capacitance of the device.

Normal ferroelectric capacitors, described above, have the hysteresis loop arranged substantially symmetrically about the point of zero applied voltage. Thus when a voltage source is removed from such a capacitor the device maintains the state of polarization to which it was last switched.

By contrast certain ferroelectric crystals, such as guanidinium aluminum sulphate hexahydrate, for example, have the property of an internal bias exhibited by a shift of the hysteresis loop along the voltage axis. This property has been described in an article entitled "Properties of Guanidinium Aluminum Sulphate Hexahydrate and Some of its Isomorphs," by A. N. Holden, W. J. Merz, J. P. Remeika, and B. T. Matthias, appearing in the Physical Review, vol. 101, second series, No. 3, at page 962. In such crystals only one stable state of polarization exists for the case of no applied voltage; although if a proper polarity voltage of amplitude sufficient to overcome the effective internal bias in addition to the normal switching voltage is applied, the electric dipoles switch to a second state which is stable only as long as the applied voltage remains. When it is removed, the dipoles switch spontaneously from the conditionally stable state to that state corresponding to zero applied voltage. Like normal ferroelectric capacitors, internally biased ferroelectrics exhibit a comparatively high capacitance, and therefore, low impedance, during dipole switching, while the capacitance is low and the impedance high when switching is not taking place.

A ferroelectric shift register using normal ferroelectric capacitors as the storage elements is completely disclosed in J. R. Anderson application Serial No. 513,710 filed June 7, 1955. The suitability of such a circuit to the rapid and compact storage of information is readily apparent. Until now, ferroelectric shift registers known in the art have required the use of either two driving pulse sources or the provision of pulses of two polarities from a single driving pulse source to satisfactorily shift stored information through the register. My present invention advantageously eliminates the need for the second driving pulse source in a ferroelectric shift register by employing biased ferroelectric capacitors to spontaneously shift the stored information between stages in addition to acting as temporary storage elements.

It is a general object of this invention to provide an improved ferroelectric shift register circuit.

More particularly, an object of this invention is a reduction in the complexity of the drive voltages needed to operate such a circuit.

In an embodiment of this invention, a normal ferroelectric capacitor is connected in series with a double anode silicon diode and a biased ferroelectric capacitor to form one stage of a shift register. A plurality of such stages may be connected together by conventional diodes to form the register. The normal ferroelectric capacitors are initially polarized in a direction opposite to that direction of polarization for the biased ferroelectric capacitors. Such polarization corresponds to the storage of a binary "0" in the stage. Application of a positive pulse corresponding to a binary "1" to the input of the register reverses the direction of polarization in the normal ferroelectric capacitor of the first stage, thereby storing a "1." Next, the application of a positive drive pulse across the stage switches both ferroelectric capacitors, transferring the binary "1" to the biased ferroelectric capacitor. Termination of the drive pulse permits the biased ferroelectric capacitor to resume its stable state of remanent polarization with the production thereby of a current pulse. With the proper polarity of interconnecting diodes this current pulse from the previously switched biased ferroelectric capacitor is directed to the normal ferroelectric capacitor of the next succeeding stage. Thus, the storage of a binary "1" has been shifted from one stage to the next, the drive pulse shifting it into the biased ferroelectric capacitor and the termination of the drive pulse permitting this ferroelectric capacitor to shift it to the next stage. Succeeding drive pulses shift the binary "1" to succeeding stages of the shift register in the same manner.

It is a feature of this invention that an electrical circuit include a biased ferroelectric capacitor and a normal ferroelectric capacitor connected in series with a diode interposed between the two.

It is a further feature of this invention that pulses of single polarity be applied across a pair of ferroelectric capacitors to reverse their polarization states.

It is another feature of this invention to use biased ferroelectric capacitors as the pulse source to shift the storage of a binary "1" from one stage of a shift register to the next.

A complete understanding of this invention and of these and various other features thereof may be gained from the following detailed description and the accompanying drawing, in which:

Fig. 1 is a circuit schematic representation of a ferroelectric shift register using double anode silicon diodes as the intrastage elements and conventional diodes as the interstage elements as disclosed in application Serial No. 513,710 filed June 7, 1955 of J. R. Anderson;

Figure 1:
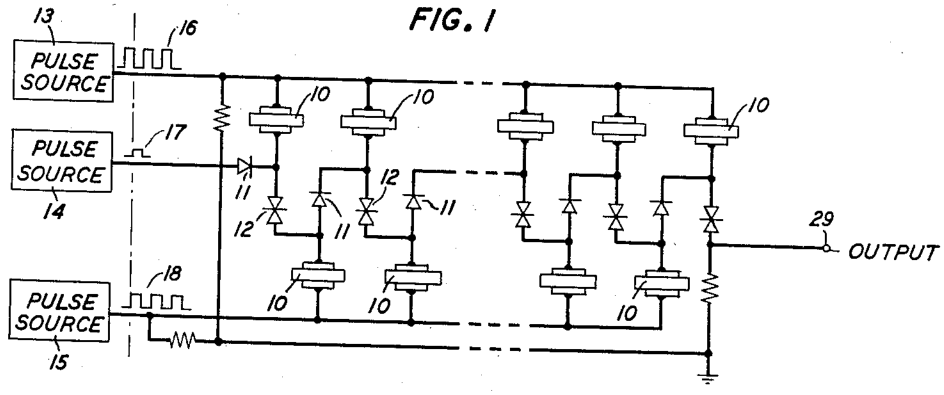

Turning to Fig. 1, this shows a ferroelectric shift register of the type disclosed in application Serial No. 513,710 filed June 7, 1955 of J. R. Anderson. A pair of normal ferroelectric capacitors 10 are arranged in series connection with a double anode diode 12 situated between them. This constitutes one stage of the shift register. An input terminal of this stage is located at the common point between the double anode diode 12 and the upper capacitor 10. Positive information pulses 17 from a pulse source 14 are applied to this terminal of the first stage through a conventional diode 11. An output terminal for this stage is located at the common junction between the double anode diode 12 and the lower capacitor 10. Connection is made between the output terminal of one stage and the input terminal of the next succeeding stage by a conventional diode 11. Two pulse sources 13 and 15 furnish positive drive pulses 16 and 18 respectively on two separate drive pulse leads. Pulses 17 and 18 advantageously occur simultaneously but following in time the application of pulse 16.

Figure 2:
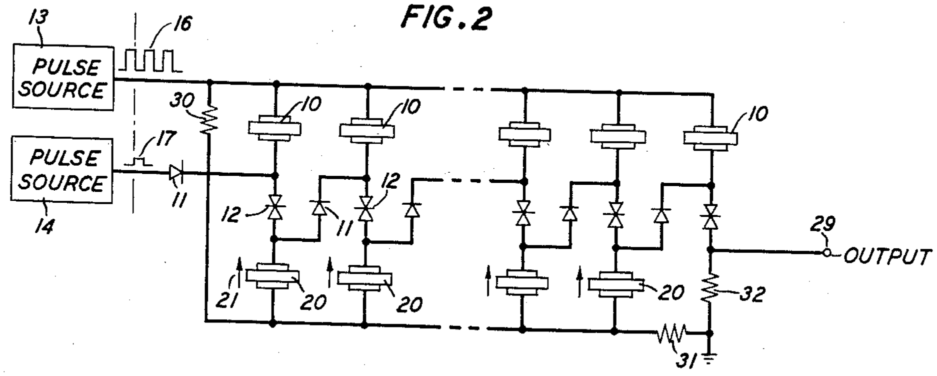
Fig. 2 is a circuit schematic representation of an embodiment of my invention showing the use of internally biased ferroelectric capacitors as the lower storage element in the ferroelectric shift register stage.

It will be noted that three pulse sources 13, 14 and 15 are used in the satisfactory operation of this circuit. In Fig. 2 is shown a similar shift register circuit in accordance with my present invention with internally biased ferroelectric capacitors 20 employed as the lower storage element in each stage of the register. The polarity of these biased capacitors is arranged as indicated by the arrows 21 which will be explained later. Only two pulse sources 13 and 14 are needed for this circuit. Arrow 21 indicates the direction of polarization for the condition of zero applied voltage on biased capacitor 20. As before, the upper ferroelectric capacitor 10 is initially polarized in the opposite direction from that of the biased capacitor 20. Application of the pulse 17 corresponding to binary "1," passes through diode 11 to reverse the polarity of ferroelectric capacitor 10. Pulse 17 is of insufficient amplitude to break down the intrastage double anode silicon diode in this circuit. The stage is now in a state corresponding to the storage of a binary "1." Driving pulse 16 applied across the stage switches both capacitors 10 and 20, transferring the temporary storage of the binary "1" to capacitor 20 and returning capacitor 10 to its binary "0" state. Upon termination of pulse 16, biased capacitor 20 switches spontaneously to return to its stable state of remanent polarization. This spontaneous switching produces a current pulse which is now directed by the diodes 11 and 12 to the upper capacitor 10 of the succeeding stage to switch that capacitor, thereby storing a binary "1" in it. In the manner just described the state of remanent polarization corresponding to a binary "1" existing in any particular stage of the register is stepped successively down the register until eventually it appears as a positive pulse at the output terminal 29. Resistor 30 provides a return path for the switching current from the biased ferroelectric 20. Resistor 32 is the output resistance of the register across which the output pulses are developed. Resistor 31 furnishes a D.-C. path to reference potential from the base of the register stages.

Figure 3:
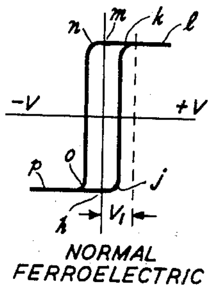
Fig. 3 is a hysteresis loop plot of charge vs. voltage for a normal ferroelectric capacitor.

The hysteresis loop plot of a normal ferroelectric capacitor appearing in Fig. 3 shows the two stable points of remanent polarization $h$ and $m$. If we start at $h$, a negative voltage has no effect on the capacitor since the charge moves from $h$ to $p$ and finally back to $h$ upon removal of the negative voltage. If a positive voltage is applied, however, the state of charge travels along the path $hjkl$ reversing the polarity of charge on the capacitor. Removal of the positive voltage now leaves the capacitor's remanent polarization at point $m$ opposite to its prior state. Additional application of positive voltages now have no effect since they merely cause the capacitor's charge to traverse the path $mkl$. But the application of a negative voltage will switch the capacitor back to its original state along the path $mnop$ and finally to $h$.

Figure 4:
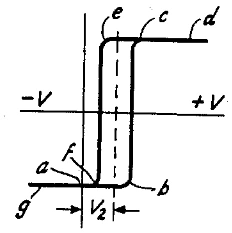
Fig. 4 is a hysteresis loop plot of charge vs. voltage for an internally biased ferroelectric capacitor.

In Fig. 4 which depicts the hysteresis loop of an internally biased ferroelectric capacitor, such as of guanidinium aluminum sulphate hexahydrate, it can be seen that only one state of stable remanent polarization exists for zero applied voltage. This is point $a$ in the diagram. From this point, the application of a negative voltage merely takes the capacitor to point $g$ and switching is impossible. Positive voltage of amplitude in excess of the sum of the normal switching voltage $V_1$ of Fig. 3 plus the effective internal bias $V_2$ will switch the capacitor by driving the state of charge along path $abcd$. Upon the removal of this voltage, however, the capacitor switches spontaneously along the path $dcefa$. Thus, only one stable state for an internally biased ferroelectric capacitor exists and any other state of polarization is merely conditionally stable.

The arrow 21 of Fig. 2 corresponds to the polarity indicated by the diagram of Fig. 4. That is, the application of a positive voltage to the capacitor terminal corresponding to the point of the arrow with respect to the other terminal, will switch the capacitor from stable state $a$ to conditionally stable state $d$ with eventual return to $a$ when the positive voltage is removed. On the other hand, a negative voltage at the point of the arrow has no effect on the capacitor.

Reference is hereby made to application Serial No. 627,381, filed December 10, 1956, of J. R. Anderson and R. M. Wolfe describing another ferroelectric shift register circuit incorporating biased ferroelectric capacitors.

It is to be understood that the above described arrangements are illustrative of the application of the principles of the invention. Numerous other arrangements may be devised by those skilled in the art without departing from the spirit and scope of this invention.

What is claimed is:

1. A shift register circuit comprising pairs of first and second ferroelectric capacitors, each said first ferroelectric capacitor having a hysteresis loop substantially centered about the point of zero applied voltage, each said second ferroelectric capacitor having a hysteresis loop substantially centered about some point of applied voltage displaced from zero, each said second ferroelectric capacitor having the capability of producing a reverse pulse after its state of remanent polarization has been switched, pulse directing means connecting said capacitors both within a pair and between pairs whereby the pulse produced by said second ferroelectric capacitor is directed to said first ferroelectric capacitor of the next succeeding pair; and means for applying pulses of a single polarity across said pairs of ferroelectric capacitors.

2. In a shift register circuit a plurality of stages, each comprising a normal ferroelectric capacitor in series connection with a biased ferroelectric capacitor, means for applying signal pulses between said normal and said biased ferroelectric capacitors, means for applying drive pulses of a single polarity across said stages, pulse directing means interconnecting said capacitors whereby upon termination of each drive pulse the spontaneous switching of those biased ferroelectric capacitors priorly switched by said drive pulse reverses the polarization of said normal ferroelectric capacitor in the next succeeding stage, and output means connected to at least one of said stages.

3. An electrical circuit comprising a plurality of pairs of serially connected normal and biased ferroelectric capacitors, each said biased ferroelectric capacitor having the capability of reestablishing spontaneously its state of stable remanent polarization, pulse directing means interconnecting said ferroelectric capacitors within said pairs, driving pulse means applied across said pairs, and means connecting successive pairs of said capacitors whereby said spontaneous reestablishment of said stable remanent polarization state by said biased ferroelectric capacitor produces a reversal of remanent polarization in said normal ferroelectric capacitor in the next succeeding pair.

4. An electrical circuit comprising a normal ferroelectric capacitor in series connection with a biased ferroelectric capacitor, said biased ferroelectric capacitor having the capability of reestablishing spontaneously its state of stable remanent polarization, means for applying signal pulses at a point between said ferroelectric capacitors, means for applying drive pulses across only said ferroelectric capacitors whereby upon termination of any drive pulse said biased ferroelectric capacitor spontaneously reestablishes its stable remanent polarization state, and load means connected to a point between said pair of ferroelectric capacitors.

5. A shift register circuit comprising first storage elements including normal ferroelectric capacitors, second storage elements including biased ferroelectric capacitors, each of said biased ferroelectric capacitors being connected at the same electrode thereof to two adjacent normal ferroelectric capacitors, and means for transferring information from one of said first storage elements to one of said second storage elements and from said one second storage element to the succeeding first storage element in response to a single pulse, said means including means for applying a shift pulse across said first and second storage elements in series.

6. An electrical circuit comprising a normal ferroelectric capacitor in series connection with a biased ferroelectric capacitor, said biased ferroelectric capacitor having the capability of spontaneously reestablishing its state of stable remanent polarization, a diode between said capacitors, and means for applying pulses across said capacitors and diode.

7. An electrical circuit comprising pairs of serially connected normal and biased ferroelectric capacitors, driving pulse means including a pulse source to shift both capacitors in a pair, and pulse directing means connecting adjacent pairs to transfer the pulse produced by the biased ferro-electric capacitor of a first pair at the termination of a pulse from said driving pulse source to the normal ferroelectric capacitor of the next succeeding pair to reverse the remanent polarization state in the normal ferroelectric capacitor of the succeeding pair.

8. An electrical circuit comprising at least a first and a second normal ferroelectric capacitor, a biased ferroelectric capacitor connected to each of said normal capacitors, means for applying a drive pulse across said first and biased capacitors in series to transfer information from said first to said biased ferroelectric capacitor, and means connecting said biased ferroelectric capacitor to said second capacitor to deliver a pulse from said biased capacitor to said second capacitor on the spontaneous switching of said biased capacitor, thereby transferring said information spontaneously from said biased capacitor to said second capacitor on removal of said drive pulse.

No references cited.